Dec. 25, 1951 K. L. BUNYARD 2,580,071

PHONOGRAPH

Filed Dec. 30, 1948 2 SHEETS—SHEET 1

INVENTOR.
KENNETH. L. BUNYARD
BY Pennie, Edmonds, Morton & Barrows
HIS ATTORNEYS

PHONOGRAPH

Filed Dec. 30, 1948 2 SHEETS—SHEET 2

INVENTOR.
KENNETH L. BUNYARD
BY Pennie, Edmonds, Morton & Barrows
HIS ATTORNEYS

Patented Dec. 25, 1951

2,580,071

UNITED STATES PATENT OFFICE 2,580,071

PHONOGRAPH

Kenneth L. Bunyard, Flushing, N. Y.

Application December 30, 1948, Serial No. 68,167

1 Claim. (Cl. 274—9)

This invention relates to improvements in phonographs, the primary object being to provide a phonograph which is extremely light in weight and having at the same time a remarkably good tone quality.

Another object of the invention is to provide a phonograph which is light enough to be held in the hand while it is being played.

Another object of the invention is to provide a disc record phonograph which can be played by hand.

Another object of the invention is to provide a phonograph sufficiently light in weight to permit it to be sent through the mails at first class postage rates.

Another object of the invention is to provide a phonograph which is extremely simple in construction, having few parts, and which is capable of being manufactured at very low cost.

The invention will be understood by examining the accompanying drawings and the following description of several embodiments of the invention. In these drawings, Figure 1 is a plan view of the phonograph;

Figures 6, 7, 8, 9, 10, 11, 12, 13, 14, 15:
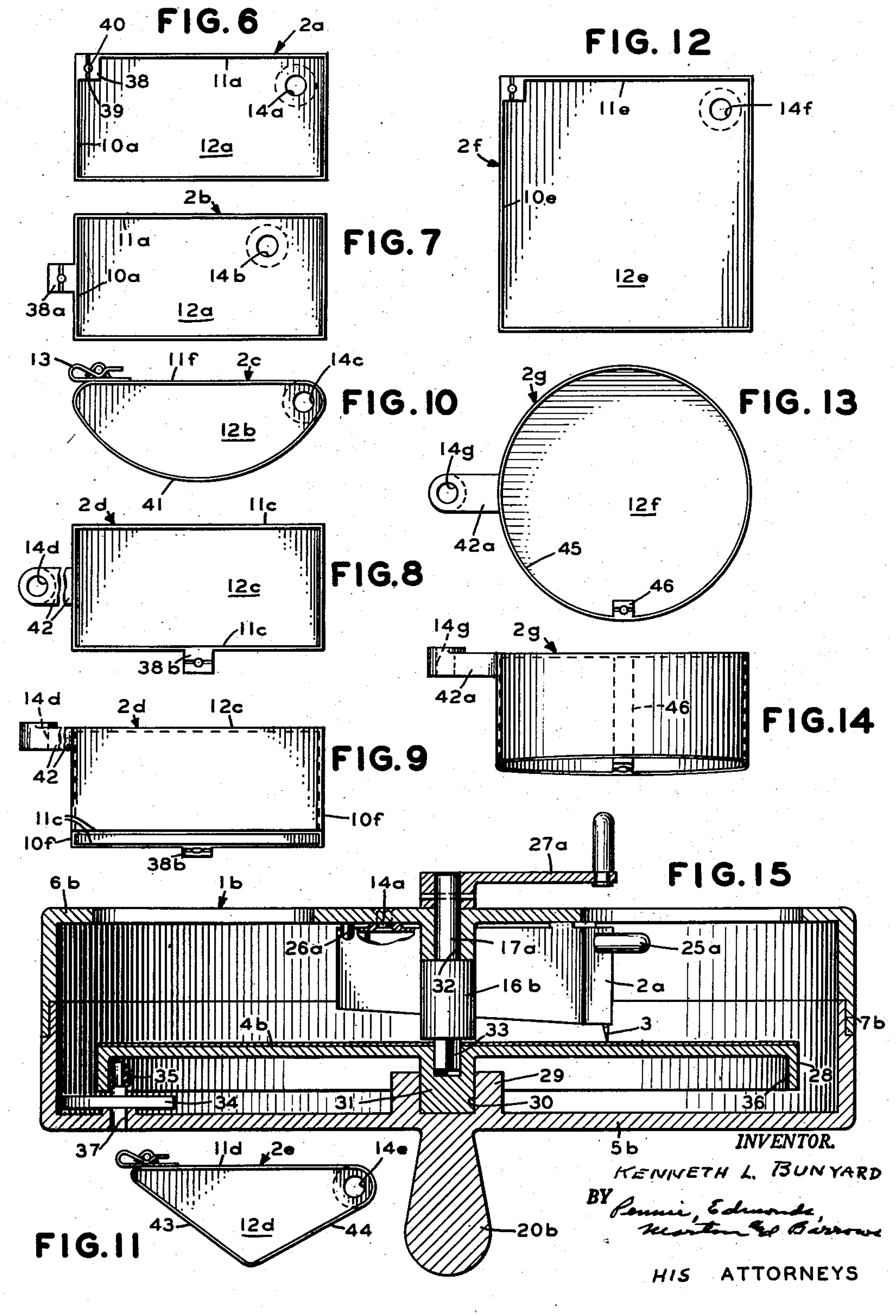

Figures 6–14, inclusive, show various modified forms of sound boxes, Figures 6, 7, 8, 10, 11, 12 and 13 showing the sound box, in each case, in bottom view. Figure 9 is a side view looking from the needle side of the sound box shown in Figure 8. Figure 14 is a similar view of the sound box shown in Figure 13; and Figure 15 is a vertical section similar to Figure 2 showing another modification of the phonograph.

Referring now to the accompanying drawings, and particularly to Figures 1–4, the improved phonograph comprises a resonance chamber or box indicated generally by reference numeral 1, a reproducer or sound box 2, a stylus 3 and a phonograph record 4 of the disc or sheet type. Resonance box 1 comprises a lower section 5 and an upper section 6, the two being removably attached to one another by any suitable means which will secure them firmly together and maintain the top and bottom walls in spaced relation. As shown in the drawings, resonance box 1 is a round or cylindrical structure having cylindrical side walls. The upper and lower sections are telescoped together by means of a joint including at least one stop shoulder 8 which serves to maintain the desired spacing of the top and bottom walls. Instead of resonance box 1 being round, it can be made hexagonal, square, or of other configuration.

Figure 1:
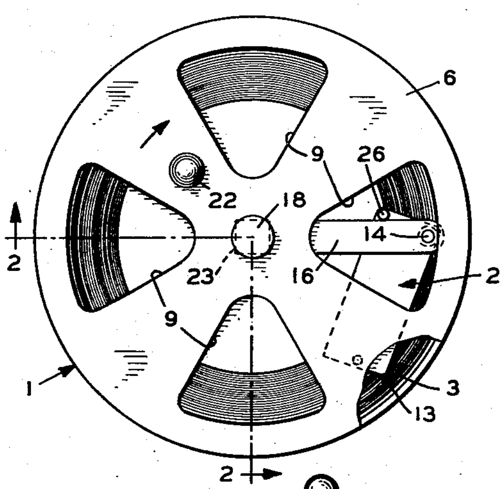
Figure 3:
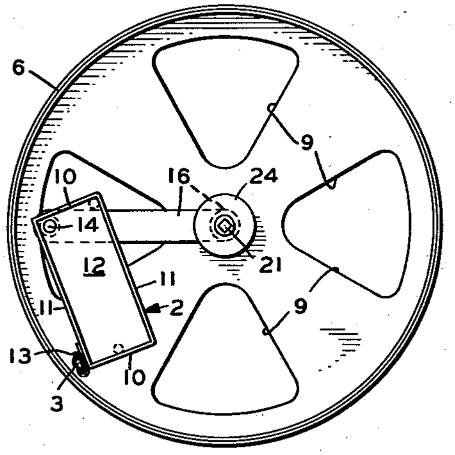
Figure 3 is a bottom view of the cover portion of the phonograph and associated parts and drawn to the same scale as Figure 1.

The lower section 5 of the box has a flat and preferably closed bottom or floor portion against which the record 4 is placed. The end top wall of the upper box section 6 is also preferably flat and parallel with the floor section 5, and this upper wall is provided with a series of sound openings 9, of any suitable shape and size, but preferably approximately triangular as shown in Figures 1 and 3. Resonance box 1 may be constructed of any stiff and comparatively rigid material, such as fibrous material including fiber board, vulcanized fiber, cardboard, wood or plastic material, such as styrene, Bakelite, beetle, urea, etc., or of sheet metal.

Figures 2, 5:
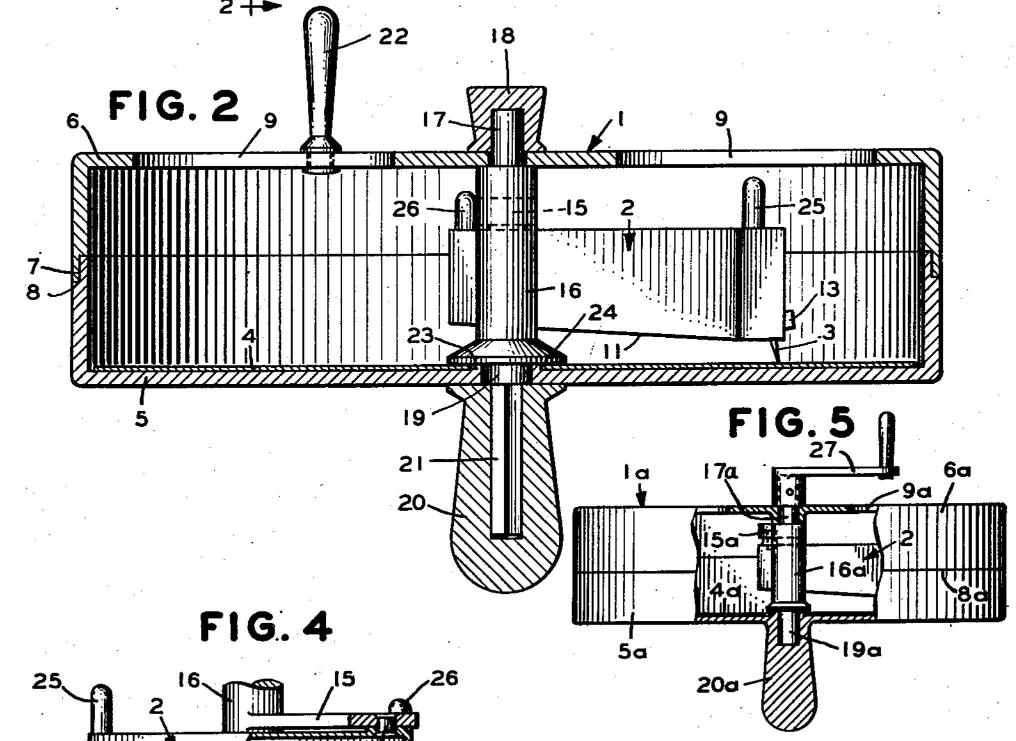
Figure 2 is a view in vertical section taken on the broken line 2—2 of Figure 1 and drawn to an enlarged scale.
Figure 5 is a view similar to Figure 2 but drawn to a greatly reduced scale and illustrating a modification.
Figure 4:
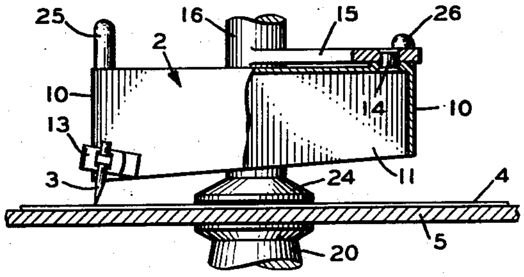
Figure 4 is a view in side elevation of the sound reproducer, or sound box, of the invention with the front wall thereof broken away and shown in section to illustrate the sound box mounting.

The reproducer or sound box 2 is a box-like member open only on one face, namely the bottom, which is disposed toward and somewhat spaced from the surface of record 4 as shown in Figures 2 and 4. Sound box 2, the preferred form as shown in Figures 1–4, is a hollow, rectangular polyhedron provided with parallel end walls 10, parallel side walls 11 and a top face 12, but with no bottom wall. The side walls 11 preferably slope upwardly towards the rear or opposite end of the box from the stylus 3 which is preferably mounted at the outer corner of the box adjacent outer side wall 11 and front end wall 10. Hence rear end wall 10 is somewhat less in height than front end wall 10. The stylus may be conveniently held in a metal spring clip mounting 13 fixed permanently to the outer side wall 11 as shown in Figure 4.

Sound box 2 is made of a resilient material to enable its walls and face to be set in vibration by the needle. Preferably, the side walls 10 and 11 and the face or top 12 are integral. They can be molded of a suitable plastic material, such as styrene, Bakelite, beetle and urea. The sound box can also be made of wood, vulcanized fiber, or of cardboard or fiber board suitably impregnated to give the requisite stiffness and resilience. It can also, if desired, be made of sheet metal. The thickness of the side walls and face are preferably the same and the desirable thickness is about $\frac{1}{32}$ of an inch except that in the case of a box made of metal the walls can be considerably thinner depending upon the springiness of the metal.

Sound box 2 is supported by means of a pivot mounting 14 at the end of an arm 15 which extends laterally from a shaft 16, these two parts preferably being integral as shown in Figure 4. Shaft 16 has an enlarged central portion as shown in Figure 2 and a reduced upper end portion 17 which passes through an aperture in upper section 6 of resonance box 1 and is arranged with a turning fit in a projection which serves as a handle 18 for the upper section 6. It is permanently attached in any suitable manner to the outer surface of upper section 6.

A second cylindrical bearing portion 19 at the opposite end of shaft 16 is arranged with a turning fit in an aperture in lower section 5 which is in alignment with the aperture in handle 18. A supporting handle 20 is provided adjacent lower section 5 and is removably positioned on an extension 21 of shaft 16. In playing the phonograph shaft 16 is held stationary, that is, prevented from rotating, by means of handle 20, and, consequently, handle 20 and extension 21 are appropriately secured to one another. This can be accomplished by providing a square hole in handle 20 and forming extension 21 square in cross section to fit within this aperture. In playing the phonograph it is held in one hand by means of the handle 20, as just indicated, and the resonance box 1 is rotated by means of an operating crank 22 which is attached to and projects from the upper section 6 of this box. Record 4 turns with the resonance box 1 and in order to insure that it does not slip on the surface of lower section 5, the record may be provided with a square central aperture which is placed upon a square boss or lug 23 which projects from the inner surface of the bottom wall of lower section 5 surrounding the aperture through which shaft bearing 19 passes. For the purpose of preventing the record from becoming disengaged from lug 23 a flange 24 may be provided on shaft 16.

In starting the playing of a record, sound box 2 is shifted about its pivot 14 by means of a handle 25 which is manipulated through one of the apertures 9 in upper section 6 of the resonance box and needle 3 is placed in the outermost groove of record 4. A lug 26 is preferably provided on the rear end inner corner of the top of sound box 2 which engages one side of arm 16 and serves to facilitate the proper positioning of the needle on the record surface. As the record is played, sound box 2 swings about its pivot mounting 14 as the needle progresses toward the inner portion of the record.

When it is desired to change the record, handle 20 is first removed from extension 21. Then, upper section 6 is removed from lower section 5, together with shaft 16, the upper journalled end 17 of this shaft preferably being held in the bearing recess in handle 18 in such a way that it can freely turn but not move longitudinally. Record 4 is now exposed and can be removed from the bottom of lower section 5 and a different record inserted on lug 23 in its place. Thereupon, the upper section 6 is reassembled on lower section 5, handle 20 is replaced, and sound box 2 is manipulated to place needle 3 at the outside of the record.

The modified form of phonograph shown in Figure 5 is similar to that described above except that the resonance box 1–*a* is stationary and the shaft 16–*a* revolves, the reverse arrangement of the previously described construction. Accordingly, handle 20–*a* is fixed to or made integral with the lower section of the resonance box and is provided at its upper portion with a recess for the reception of a comparatively short end bearing 19–*a* at the lower end of shaft 16–*a*. The upper journalled portion 17*a* of shaft 16–*a* is extended through the resonance box and an operating crank handle 27 is fixed thereto. The remaining parts of the phonograph are like those described in connection with Figures 1–4. Consequently, a sound box 2 is used and is mounted in the same way as shown in Figure 4, namely by means of a pivot connection on the outer end of an arm 15–*a* projecting from shaft 16–*a*. The record 4–*a* can be changed in substantially the same manner as described above.

Referring now to the modification shown in Figure 15, the record 4–*b* is supported upon a rotating table 28 within the resonance box 1–*b*, the entire resonance box being stationary and the record table 28 being rotated by means of a crank handle 27–*a*. The resonance box is provided with a supporting handle 20–*b*, preferably formed integral with the lower section 5–*b* and on the inside wall of this section opposite the handle a boss 29 is formed at the center of which there is an aperture 30 to form a supporting bearing for a shaft 16–*f* which projects downwardly to the center of table 28.

Shaft 16–*b* is provided with a bearing extension 17–*a* at its upper portion which turns in a bearing aperture 32 formed in the wall of upper section 6–*b*. In order to drivingly connect shaft 16–*b* with record table 28, its lower end is provided with a square extension 33 which engages a square aperture in the upper surface of table 28. The aperture in record 4–*b* may also be made square to fit this projection, if desired. When the two sections of the resonance box 1–*b* are separated along their telescoping joint 7–*b* in order to change the record, extension 33 slides out of its aperture in the record table.

In this modification the sound box 2–*a* is pivoted at 14–*a* to the horizontal wall of upper section 6–*b*, and a rib or boss 47 is provided on the upper surface of the sound box to contact the inner surface of this horizontal wall. Rib 47 mechanically transmits vibration of the sound box to the horizontal wall and the vibration of this wall supplements that of the sound box in the production of sound from the vibrating stylus or needle 3. Rib 47 is positioned at a node point of the top face or wall of the sound box, preferably the node point which is nearest the stylus. The rib is preferably narrow, about ⅜ of an inch, so as to reduce frictional drag on the needle as the sound box swings inwardly about pivot 14–*a* as the record is played, and preferably extends across the width of the sound box. The manipulating handle 25–*a* of the sound box projects horizontally from the front of the box. A stop lug 26–*a* may be provided on the interior surface of upper section 6–*b* to engage the side of the sound box and aid in placing the needle in the starting groove.

In the form of the inventions shown in Figures 1–4 where the resonance box rotates, the inertia of this resonance box aids in imparting a steady rotation so as to give a smooth playing of the record. In other words, the resonance box serves as a fly wheel. In the modification of Figure 15, record table 28 being constructed of as light material as possible in order to make the overall weight of the phonograph light, it is desirable to provide a small fly wheel 34, otherwise the playing of the record tends to be uneven. Fly wheel 34 need not be heavy as it is geared to rotate at a comparatively high speed. For this purpose the upper end of the fly wheel shaft may be provided with a friction roller 35 which engages the internal surface of a flange 36 depending from the edge of table 28. The lower end of the fly wheel shaft may rotate in a bearing aperture 37 provided in the bottom wall of lower box section 5–b.

Referring now to Figures 6 and 7, there are here shown two modified forms of sound boxes which are like sound box 2 except for the form and position of the needle mounting. In Figure 6 the needle is mounted on the inside corner of the box instead of on the outside as in sound box 2. In Figure 7 the needle is mounted at the center of the end wall 10–a of the box instead of at the corner, and the pivot mounting 14–b is somewhat to the left of mounting 14–a in order to maintain the distance from this mounting to the needle. In each of these forms of sound box, instead of using a metal clip to support the needle, the needle is forced into an aperture formed in the material of the sound box itself. Thus, in the sound box 2–a of Figure 6 a block 38 is mounted on the interior corner of the walls of the box, preferably being made integral therewith, and a narrow slit 39 is cut midway of this block. A round aperture 40 is placed at the center of slit 39 and the two halves of block 38 are sprung apart sufficiently to receive the needle which is thus held by the clamping friction of the two halves.

In the sound box 2–b of Figure 7, block 38–a is mounted on the outside of the end wall 10–a at the center. Otherwise, the construction is the same as just described. These forms of needle mounting are convenient when the sound box is made of molded plastic material.

The modified form of sound box 2–c shown in Figure 10 has a single flat wall 11–b extending along the outer side of the closed face 12–b from the needle to the pivot mounting 14–c. The wall 41 opposite wall 11–b is formed in a sweeping curve, the maximum width of the box being approximately the same as the width of sound box 2.

In Figures 8 and 9, there is shown a modified sound box in which the needle is supported at the center of the outer side wall 11–c. In order to maintain the required distance between the needle and the pivot 14–d, the pivot is carried at the outer end of an extension 42 formed in end wall 10–b near the top of closed face 12–b. In this instance the needle is mounted in a slitted block 38–b which extends part way up the side of wall 11–c as shown in Figure 9. The side wall 11–c which supports the needle is deeper than the opposite side wall so that the end walls 10–b slope upwardly from the needle side towards the opposite side.

In Figure 11, there is shown another modified form of sound box which is somewhat similar to the sound box 2–c of Figure 10. The wall 11–d corresponds to wall 11–b of Figure 10, the needle being mounted near one end and the pivot 14–e near the other end. Instead of the curved wall 41 two flat walls 43 and 44 are used, thus making the outline of the sound box substantially triangular.

In the form of the sound box shown in Figure 12, the side walls 10–e and 11–e are equal and the closed upper face 12–e is square. The length of each side of the box is such that the needle can be mounted at one corner and the pivot 14–f at an adjacent corner.

Still another form of sound box is illustrated in Figures 13 and 14 in which the side walls 45 are cylindrical and the closed upper face 12–f is round. A needle supporting block 46 is arranged at one side of the sound box, the outer side when the box is placed in position in the resonance chamber or box 1. Needle block 46 extends to and joins the inner surface of the top face 12–f. The block is preferably somewhat wider where it joins the surface of face 12–f in order to impart the needle vibration to this face more readily. This sound box 2–g is provided with a projection 42–a near the face 12–f to support the pivoted mounting 14–g.

All of the various forms of sound box are preferably constructed to have the height of their walls approximately one-half or a little less than about one-half of the greatest dimension of the box. Preferably also, the maximum width of the elongated forms is about one-half the length. This means that the average height of side walls 11 of sound box 2 is a little less than the width of the box. In the case of modified box 2–g the height is a little less than about half the diameter.

Several modifications have been utilized in describing the improved phonograph device as a whole and the sound box. It will be understood, however, that the invention is not limited to these precise constructions but that other changes can be made without departing from the spirit and scope of the invention as set forth in the appended claim.

I claim:

A phonograph instrument comprising a resonance box having a substantially flat inner or bottom face and a perforated outer or top face, a disc-like phonograph record resting on the inner surface of said inner face, a central shaft journalled in apertures in said faces and having a portion projecting through said inner face, a supporting handle for the instrument associated with said projecting shaft portion, a sound box having a stylus thereon, an arm attached to said shaft and extending substantially at right angles thereto within said resonance box, a pivotal connection between said arm and sound box for supporting the sound box in playing relation to said record, and a crank handle projecting outwardly from said outer face of the resonance box for rotating this box on said shaft to play the instrument.

KENNETH L. BUNYARD.

REFERENCES CITED

The following references are of record in the file of this patent:

UNITED STATES PATENTS

| Number | Name | Date |
|---|---|---|
| 639,452 | Smallwood | Dec. 19, 1899 |
| 836,470 | Smith | Nov. 20, 1906 |
| 1,178,840 | Cassard | Apr. 11, 1916 |
| 1,629,971 | Rook | May 24, 1927 |
| 1,979,067 | Franklin | Oct. 30, 1934 |
| 2,103,739 | Whelan et al. | Dec. 28, 1937 |

FOREIGN PATENTS

| Number | Country | Date |
|---|---|---|
| 24,784 | Great Britain | Dec. 30, 1914 |
| 336,844 | Germany | May 13, 1921 |